E. P. BEACH.
TIRE.
APPLICATION FILED OCT. 20, 1910.
990,214.
Patented Apr. 25, 1911.
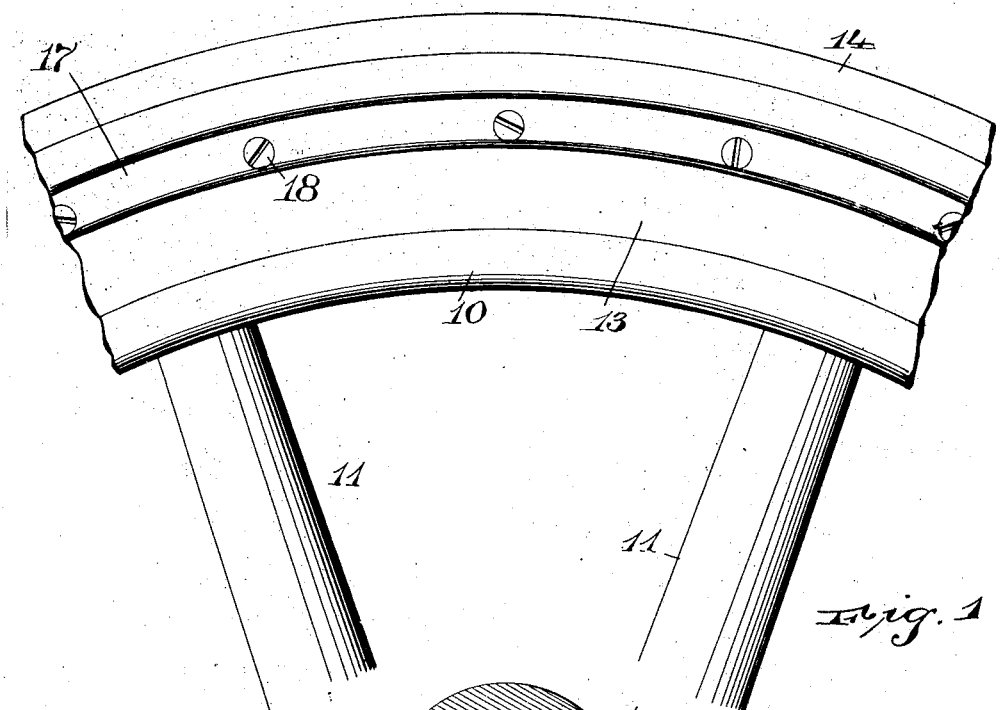
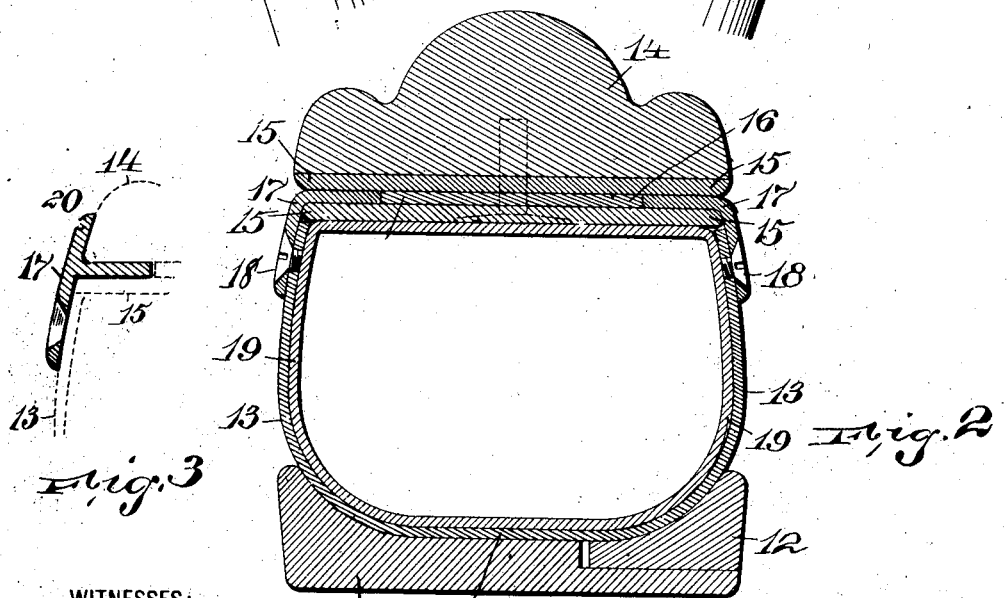
WITNESSES:
E. A. Pell
M. A. Johnson
INVENTOR
Edward P. Beach,
BY
Wm. H. Camfield
ATTORNEYS

UNITED STATES PATENT OFFICE.

EDWARD P. BEACH, OF FREEHOLD, NEW JERSEY.

TIRE.

990,214.

Specification of Letters Patent.   Patented Apr. 25, 1911.

Application filed October 20, 1910. Serial No. 588,014.

*To all whom it may concern:*

Be it known that I, EDWARD P. BEACH, a citizen of the United States, residing at Freehold, in the county of Monmouth and State of New Jersey, have invented certain new and useful Improvements in Tires; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a tire that is adapted to be resilient and which is inflated and is provided with a tread which coöperates with a puncture-resisting container to inclose an inner tube. The container is adapted to be fastened, either permanently or detachably, to the felly of a wheel so that the tread is detachably secured to the open side of the container.

The invention is illustrated in the accompanying drawing, in which—

Figure 1 is a side view of a part of a wheel equipped with my improved tire, and Fig. 2 is a cross-section of the tire showing the felly of the wheel in part. Fig. 3 is a modified form of ring used in the rim.

The wheel can be of any construction in so far as its hub, spokes and rim are concerned, but I illustrate in the drawing a rim 10 supported on the spokes 11, which rim I illustrate as having a detachable portion 12 so that the tire can be taken from the rim transversely. The rim is recessed to fit a container 13 which is substantially U-shaped having an open side and having its closed side 13ª next to the rim. On the open side of the container is arranged the tread 14 which can be attached to the container in a great number of different ways, but I illustrate the tread as being supplied, on its inner side, with two long strips 15 which are preferably made of leather or similar material, and a narrower strip 16 which forms, on the side of the rim, annular recesses which are entered by the right-angled rings 17, these rings being fastened to the container by screws 18. When the screws are fastened through the right-angled rings into the container, the tread is secured tightly in place and the whole device forms a chamber for receiving and embracing the inner tube 19. The stem for inflating the inner tube is not shown, but passes in the usual way through the rim, and, of course, in this construction it also passes through the container.

The tread portion of the tire need not necessarily be made of separate pieces, and I may employ different methods than that illustrated for securing the tread to the container. The portion 14 of the tread is preferably made of rubber, and the right-angled rings 17 and the container 13 are made of a resilient, puncture-resisting material, and I prefer to employ metal which has a spring to it, such as brass or steel, but any suitable material can be employed for this purpose.

In Fig. 3 I show a modified form of ring which has the right-angled portion to engage the container and also to engage the tread to keep the tread from moving radially on the container with sufficient freedom to displace it, and is also provided with an upwardly extending flange 20 which extends all the way around, and which prevents any transverse or lateral movement of the tread, and in this way the tread is prevented from having any excessive side movement on the container.

Having thus described my invention, what I claim is:—

The combination of a vehicle wheel having a felly, with a resilient sheet metal container which is annular and has its outer periphery open, a resilient tread having sheets of stiff material of unequal widths secured to its inner side to form recesses on the opposite sides thereof, annular rings to enter the recesses and to bear on the container, screws securing the rings to the container, and an inner tube in the container and bearing on the container and the tread when inflated.

In testimony, that I claim the foregoing, I have hereunto set my hand this 17th day of October 1910.

EDWARD P. BEACH.

Witnesses:
 E. A. PELL,
 M. A. JOHNSON.